United States Patent Office.

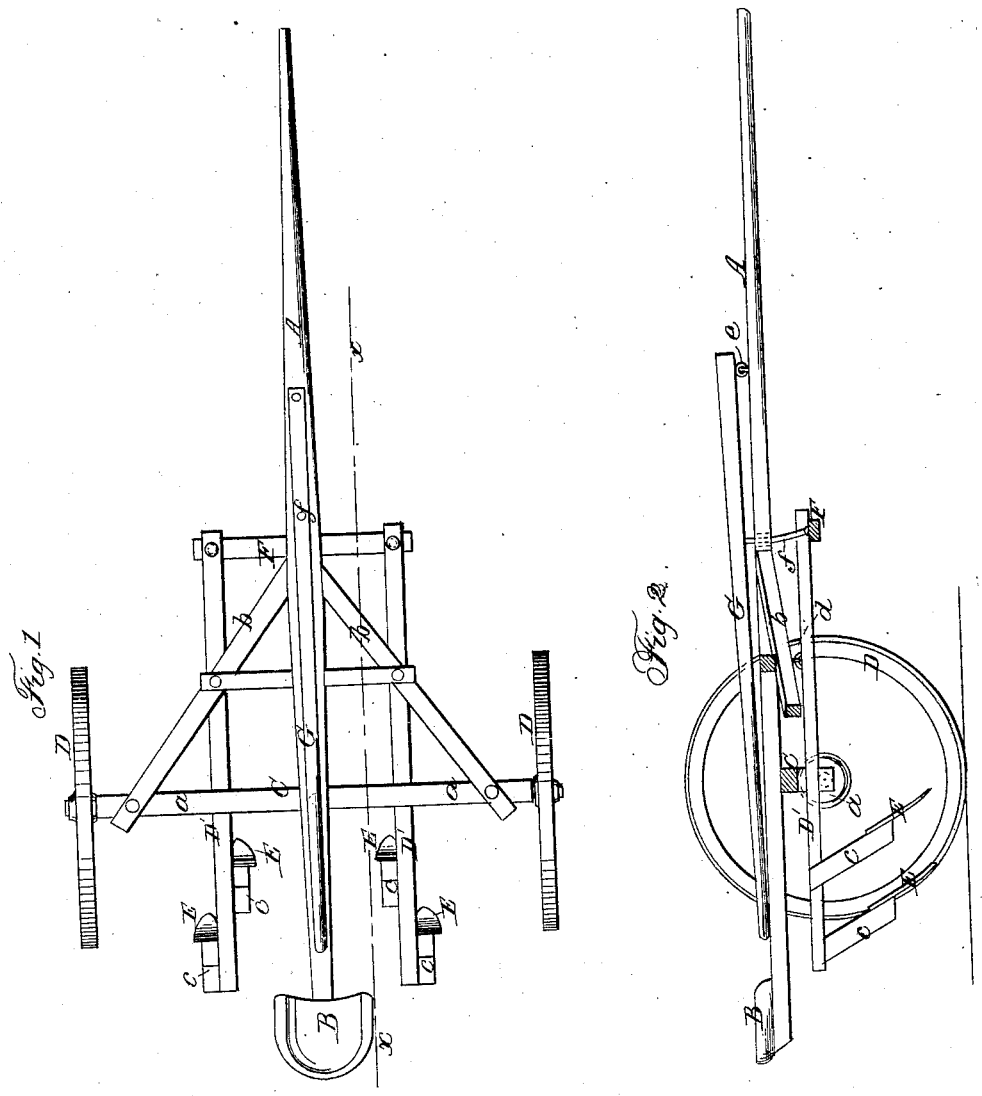

OMAR J. ARNOLD, OF MOUNT IDA, WISCONSIN.

Letters Patent No. 62,387, dated February 26, 1867.

IMPROVEMENT IN CULTIVATORS.

*The Schedule referred to in these Letters Patent and making part of the same.*

TO ALL WHOM IT MAY CONCERN:

Be it known that I, OMAR J. ARNOLD, of Mount Ida, in the county of Grant, and State of Wisconsin, have invented a new and improved Cultivator; and I do hereby declare that the following is a full, clear, and exact description thereof, which will enable others skilled in the art to make and use the same, reference being had to the accompanying drawings, forming part of this specification, in which—

Figure 1 is a plan or top view of my invention.

Figure 2, a side sectional view of the same, taken in the line $x\ x$, fig. 1.

Similar letters of reference indicate like parts.

This invention relates to a new and improved cultivator for cultivating plants which are grown in hills or drills, and it consists in a novel and improved construction of the same, as hereinafter fully shown and described, whereby a strong, durable, and economical device for the purpose specified is obtained, and one which is under the complete control of the operator or driver.

A represents the draught-pole of the device, having the driver's seat B on its rear end, and C is the axle, having wheels D D placed loosely on its ends. The axle C is formed of two inclined bars, $a$, united at their inner ends, which constitute the highest point of the axle, the elevated ends of $a\ a$ being attached to the draught-pole, and the latter extending back of the axle, as shown in both figures. The axle is braced by rods $b\ b$, the front ends of which are attached to the draught-pole, and the rear parts attached to the axle, one near each end of the latter, as shown in fig. 1. $D'\ D'$ are two beams, having each two standards, $c\ c$, attached to their rear ends, said standards having shares E secured to them, of any proper form. These beams, $D'\ D'$, are connected by joints $d$ to the brace-rods $b$, the front ends of the beams extending some distance in front of the joints $d$, and connected by a bar, F, the ends of which are pivoted to the front ends of the beams $D'\ D'$. G is a lever, the front end of which is connected by a hinge or joint, $e$, to the draught-pole A, said lever extending back to within convenient reach of the driver on seat B, and having a pin or rod, $f$, attached, which passes through the draught-pole, and bears upon the cross-bar F of the beams $D'\ D'$.

From the above description it will be seen that the axle C, in consequence of being inclined downward from its centre in both directions, will, with wheels D D of requisite diameter, be sufficiently high at its centre to pass over the tops of the plants without breaking or bending them down. It will further be seen that the beams $D'\ D'$ may, by the feet of the driver, be moved laterally, so that the shares may conform to the sinuosities of the rows of plants. The shares may be raised out of the ground at any time by depressing the rear end of the lever G. The device is composed of but few parts, and may be very strongly constructed at a small cost.

I am aware that a row-straddling wheeled-seat cultivator is not new, and of course my claims do not have reference thereto.

What I claim as new, and desire to secure by Letters Patent, is—

1. The axle C, inclined downward from its centre outward in both directions, in connection with the extended draught-pole A, and brace-rods $b\ b$, substantially as and for the purpose set forth.

2. The beams $D'\ D'$, extending in front of the joints $d$, and connected by a cross-bar, F, substantially as and for the purpose set forth.

3. The lever G, provided with the pin or rod $f$, in combination with the beams $D'\ D'$, and cross-bar F, all arranged substantially as and for the purpose specified.

OMAR J. ARNOLD.

Witnesses:
    J. H. BRUNEMER,
    MARK FINNICUM.